United States Patent
Oh

(10) Patent No.: US 7,932,972 B2
(45) Date of Patent: Apr. 26, 2011

(54) SUBSTRATE FOR LIQUID CRYSTAL DISPLAY DEVICE AND METHOD OF FABRICATING THE SAME

(75) Inventor: Jae-Young Oh, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 279 days.

(21) Appl. No.: 11/798,298

(22) Filed: May 11, 2007

(65) Prior Publication Data

US 2008/0079875 A1    Apr. 3, 2008

(30) Foreign Application Priority Data

Oct. 2, 2006 (KR) .......... 10-2006-0097235
Apr. 25, 2007 (KR) .......... 10-2007-0040148

(51) Int. Cl.
*G02F 1/1335* (2006.01)
*H01L 21/00* (2006.01)

(52) U.S. Cl. ........ 349/106; 349/104; 349/105; 349/107; 349/108; 349/109; 349/187; 438/30

(58) Field of Classification Search .......... 349/104–109, 349/187; 438/30
See application file for complete search history.

(56) References Cited

U.S. PATENT DOCUMENTS

| | | | |
|---|---|---|---|
| 5,300,350 A | | 4/1994 | Grosser et al. |
| 5,340,619 A | * | 8/1994 | Chen et al. ............ 427/498 |
| 5,418,094 A | * | 5/1995 | Sato et al. ............ 430/7 |
| 5,866,919 A | * | 2/1999 | Kwon et al. ............ 257/59 |
| 5,926,702 A | * | 7/1999 | Kwon et al. ............ 438/158 |
| 6,081,354 A | * | 6/2000 | Gambogi et al. ............ 359/15 |
| 6,399,257 B1 | * | 6/2002 | Shirota et al. ............ 430/7 |
| 6,563,557 B2 | * | 5/2003 | Yamanaka et al. ............ 349/74 |
| 6,690,437 B2 | * | 2/2004 | Yamazaki et al. ............ 349/110 |
| 6,831,297 B2 | * | 12/2004 | Arao ............ 257/59 |
| 6,924,917 B2 | | 8/2005 | Lee et al. |
| 7,259,811 B2 | * | 8/2007 | Kim ............ 349/106 |

FOREIGN PATENT DOCUMENTS

| | | |
|---|---|---|
| DE | 69333000 T2 | 2/2004 |
| DE | 69914956 T2 | 12/2004 |
| DE | 102004037013 A1 | 11/2005 |
| DE | 102005030605 A1 | 3/2006 |
| DE | 60119192 T2 | 10/2006 |
| GB | 2339320 A | 1/2000 |
| JP | 10-068811 A | 10/1998 |

* cited by examiner

*Primary Examiner* — Brian M. Healy
*Assistant Examiner* — Guy G Anderson
(74) *Attorney, Agent, or Firm* — Morgan, Lewis & Bockius LLP

(57) ABSTRACT

A method of fabricating a substrate for a liquid crystal display device includes: disposing a transparent substrate on a stage of a laser apparatus; irradiating a laser beam having a predetermined power onto the transparent substrate to form a light shielding region in the transparent substrate surrounding first to third light transmitting regions; and forming a color filter layer including red, green and blue sub-color filters respectively in the first to third light transmitting regions, wherein boundaries of the red, green and blue sub-color filters correspond to the light shielding region.

6 Claims, 11 Drawing Sheets

SUBSTRATE FOR LIQUID CRYSTAL DISPLAY DEVICE AND METHOD OF FABRICATING THE SAME

The present invention claims the benefit of Korean Patent Application No. 10-2006-0097235 filed in Korea on Oct. 2, 2006 and Korean Patent Application No. 10-2007-0040148 filed on Apr. 25, 2007, which are hereby incorporated by reference in its entirety.

BACKGROUND OF THE INVENTION

1. Field of the Invention

Embodiments of the present invention relate to a liquid crystal display device (LCD), and more particularly, to a substrate for the LCD and a method of fabricating the same. Although embodiments of the invention are suitable for a wide scope of applications, it is particularly suitable for preventing light leakage using a light shielding means that is not a black matrix formed by a photolithography process.

2. Discussion of the Related Art

Generally, an LCD device uses optical anisotropy and polarization properties of liquid crystal molecules to display an image. The liquid crystal molecules have an alignment direction along their thin and long shapes. The alignment directions of the liquid crystal molecules can be controlled by applying an electric field to the liquid crystal molecules. In other words, as the intensity of the electric field is changed, the orientation of the alignment direction for the liquid crystal molecules also changes. Since incident light through liquid crystal molecules is refracted based on the orientation of the liquid crystal molecules, due to the optical anisotropy of the aligned liquid crystal molecules, intensity of the incident light can be controlled such that images can be displayed.

Among the various types of LCD devices commonly used, active matrix LCD (AM-LCD) devices having thin film transistors (TFTs) with pixel electrodes connected to the TFTs disposed in matrix form have high resolution and superiority in displaying moving images.

FIG. 1 is a schematic perspective view of an active matrix liquid crystal display device according to the related art. As shown in FIG. 1, an array substrate 10 and a color filter substrate 20 face each other, and a layer of liquid crystal molecules 30 is interposed between the array substrate 10 and the color filter substrate 20. The array substrate 10 includes a first transparent substrate 12, a plurality of gate lines 14 and a plurality of data lines 16 crossing each other. Each of the plurality of gate lines 14 and each of the data lines 16 cross each other to define pixel regions "P." A thin film transistor "T" is formed at a crossing of the gate line 14 and the data line 16, and a pixel electrode 18 is connected to the thin film transistor "T" and is disposed in the pixel region "P." The color filter substrate 20 includes a second transparent substrate 22 including the pixel region "P," a black matrix 25 surrounding the pixel region "P" and disposed on an inner surface of the second transparent substrate 22, a color filter layer 26 including red, green and blue sub-color filters 26a, 26b and 26c and disposed within the black matrix 25. More specifically, the red, green and blue sub-color filters 26a, 26b and 26c are disposed in each pixel regions "P" and boundaries between the red, green and blue sub-color filters 26a, 26b and 26c correspond to the black matrix 25. A common electrode 28 is disposed on the color filter layer 26.

Although not shown, a seal pattern (not shown) of sealant is interposed between the array substrate 10 and the color filter substrate 20 at a periphery of the array substrate 10 and the color filter substrate 20 to attach the array substrate 10 to the color filter substrate 20 and to prevent leakage of the liquid crystal molecules 30. Further, a first orientation film (not shown) is formed between the pixel electrode 18 and the layer of liquid crystal molecules 30, and a second orientation film (not shown) is formed between the common electrode 28 and the layer of liquid crystal molecules 30. Here, the first and second orientation films set an initial direction of sub-layers of liquid crystal molecules within the layer of liquid crystal molecules 30. Furthermore, first and second polarizers (not shown) are disposed at outer surfaces of the first and second transparent substrates 12 and 22, respectively. Additionally, a backlight (not shown) is disposed at a backside of the first polarizer to supply a light source to the LCD.

When on/off signals of the thin film transistor "T" are sequentially scanned into the gate lines 14 and image signals of the data lines 16 are transmitted to the pixel electrode 18, the liquid crystal molecules 30 are driven by a vertical field electricity generated between the common electrode 28 and the pixel electrode 18. Therefore, various images can be displayed in accordance with the change of the transmittance.

The above-mentioned LCD is manufactured through an array process including forming the thin film transistor "T" and forming the pixel electrode 18 connected to the thin film transistor "T" and through a color filter process including forming the color filter layer 26 and forming the common electrode 28.

FIGS. 2A to 2G are schematic cross-sectional views illustrating a method of fabricating a color filter substrate according to the related art. As shown in FIG. 2A, a black matrix material layer 62 is formed by depositing a metallic material, including a chromium (Cr) on a transparent substrate 60. Next, a photoresist layer 64 is formed by coating a photoresist on the black matrix material layer 62. A mask 66 having a transmission area "TA" and a blocking area "BA" is disposed on the photoresist layer 64, and the photoresist layer 64 is exposed using the mask 66.

Next, as shown in FIG. 2B, a photoresist pattern 68 is formed by developing the exposed photoresist layer 64. The photoresist pattern 68 is disposed on the black matrix material layer 62 to correspond to a portion where a black matrix is to be formed later.

As shown in FIG. 2C, a black matrix 72 having first to third openings 70a, 70b and 70c is formed by removing a portion of the black matrix material layer 62 exposed by the photoresist layer 64. Although not shown, the black matrix 72 has a lattice shape in a plan view.

Next, as shown in FIG. 2D, a portion of the photoresist pattern 68 that remains on a top surface of the black matrix 72 is removed by stripping. For example, a red resist layer 74a is formed by coating a red resist in the first opening 70a of the black matrix 72. After a mask (not shown) including a transmission area (not shown) and a blocking area (not shown) is disposed on the red resist layer (not shown). The portion of the red resist layer that is to remain in the first opening 70a corresponds to the transmission area. The portion of the red resist layer corresponding to the blocking area is removed because ultra-violet light is blocked through the blocking area. Consequently, a red sub-color filter 74a is formed to correspond to the first opening 70a. Edges of the red sub-color filter 74a overlap the black matrix 72.

Next, as shown in FIG. 2E, green and blue sub-color filters 74b and 74c are sequentially formed by coating and patterning green and blue resists in the second and third openings 70b and 70c using the same process as that of the red sub-color filter 74a. The red, green and blue sub-color filters 74a, 74b and 74c constitute a color filter layer 74.

As shown in FIG. 2F, an overcoat layer 76 is formed by depositing an organic insulating layer on the color filter layer 74. Because a step difference occurs where the color filter layer 74 overlaps the black matrix 72, the overcoat layer 76 is formed to provide a planar surface for the later formed common electrode 78.

As shown in FIG. 2G, the common electrode 78 is formed by depositing a transparent conductive material, such as indium tin oxide (ITO) or indium zinc oxide (IZO) on the overcoat layer 76.

The black matrix 72 according to the related art is manufactured by a photolithography process using a mask, thereby increasing process time and cost. When the black matrix 72 and the color filter 74 are manufactured on the same substrate 60 as explained above, at least four mask processes are necessary to form the black matrix 72 and the color filter layer 74, including the red, green and blue sub-color filters 74a, 74b and 74c, thereby increasing the length and complexity of the manufacturing process so as to reduce productivity. Further, because the mask in the mask process has a relatively high-cost, the manufacturing cost is increased when the number of masking processes are increased.

To remove the step differences of the red, green and blue sub-color filters, the overcoat layer should be formed to provide a planar surface for the subsequent formation of the common electrode. Therefore, the productivity is reduced because of the need for a planarization overcoat layer. Further, the black matrix material in the pixel region may not be completely removed from the transparent substrate after forming the black matrix, so a black defect may occur. Product yield is reduced by such a black defect.

SUMMARY OF THE INVENTION

Accordingly, embodiments of the present invention are directed to an LCD and a method of fabricating the same that substantially obviates one or more problems due to limitations and disadvantages of the related art.

An object of the present invention is to provide a substrate for an LCD and a method of fabricating the same that prevent a light leakage using a light shielding means manufactured by a simple process.

Another object of the present invention is to provide a substrate for an LCD and a method of fabricating the same that can reduce the number of mask processes.

Another object of the present invention is to provide a substrate for an LCD and a method of fabricating the same that can improve a product yield by preventing a black defect.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a substrate for a liquid crystal display device includes: disposing a transparent substrate on a stage of a laser apparatus; irradiating a laser beam having a predetermined power onto the transparent substrate to form a light shielding region in the transparent substrate surrounding first to third light transmitting regions; and forming a color filter layer including red, green and blue sub-color filters respectively in the first to third light transmitting regions, wherein boundaries of the red, green and blue sub-color filters correspond to the light shielding region.

In another embodiment, a method of fabricating a substrate for a liquid crystal display device includes: forming a resin layer on a substrate; disposing the substrate on a stage of a laser apparatus; irradiating a laser beam having a predetermined power onto the resin layer to form a light shielding region in the resin layer surrounding first to third light transmitting regions; and forming a color filter layer including red, green and blue sub-color filters respectively in the first to third light transmitting regions, wherein boundaries of the red, green and blue sub-color filters correspond to the light shielding region.

In another embodiment, a substrate for a liquid crystal display includes: a transparent substrate; a light shielding region in the transparent substrate surrounding first to third light transmitting regions; and a color filter layer including red, green and blue sub-color filters having a same thickness as one another respectively positioned in the first to third light transmitting regions.

In another embodiment, a substrate for a liquid crystal display includes: a transparent substrate; a light shielding layer on the transparent substrate surrounding first to third light transmitting regions; and a color filter layer including red, green and blue sub-color filters having a same thickness as one another respectively positioned in the first to third light transmitting regions, wherein the light shielding layer is a resin including a carbonate polymer, a polyester resin, and a black coloring agent compound.

In another embodiment, a liquid crystal display device includes: a first substrate and a second substrate facing the first substrate, the second substrate containing a light shielding region and first to third light transmitting regions surrounded by the light shielding region; a color filter layer including red, green and blue sub-color filters on an inner surface of one of the first and second substrates to correspond to the first to third light transmitting regions, respectively, boundaries of the first to third light transmitting regions corresponding to the light shielding region; and a layer of liquid crystal molecules between the first and second substrates.

In a further embodiment, a liquid crystal display device includes: a first substrate and a second substrate facing the first substrate, a light shielding layer on the transparent substrate surrounding first to third light transmitting regions, wherein the light shielding layer includes a carbonate polymer, a polyester resin, and a black coloring agent compound; a color filter layer including red, green and blue sub-color filters on an entire surface of one of the first and second substrate in the first to third light transmitting regions, respectively, boundaries of the first to third light transmitting regions corresponding to the light shielding region; and a layer of liquid crystal molecules between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Embodiments of the present invention feature a portion of a transparent substrate or a portion of a resin material layer having carbon black utilized as a black matrix by irradiating a laser beam to the portion to be black in color. For example, a neodymium—yttrium aluminum garnet (Nd—YAG) is utilized as a laser apparatus for irradiating the laser beam. The Nd—YAG laser apparatus is an infrared rays laser apparatus generating a laser beam having a wavelength of about 1064 nm. Specifically, the Nd—YAG laser beam from the Nd—YAG laser apparatus is a solid state generated by $Nd^{3+}$ ions. Further, the Nd—YAG laser beam has a high amplification property and has a good mechanical property and a good temperature property.

The Nd—YAG laser apparatus has the Nd—YAG laser beam having a predetermined power of about 30 W to about 200 W, and has a laser head having a moving speed of about 7,000 mm/sec to about 12,000 mm/sec with respect to a stage of the Nd—YAG laser apparatus. That is, the moving speed can be a speed of the laser beam irradiating the laser beam or the stage speed. In the case of a continuous wave (CW) type laser apparatus, the time that the laser beam is irradiated on a particular portion depends on the moving speed so that energy intensity is determined by the moving speed of the laser head.

A light shielding means according to embodiments of the present invention acts as a black matrix by irradiating the Nd—YAG laser beam with an appropriate moving speed to the portion of the transparent substrate to be black in color or a light shielding region of a resin layer to be carbon black.

Figure 3A:
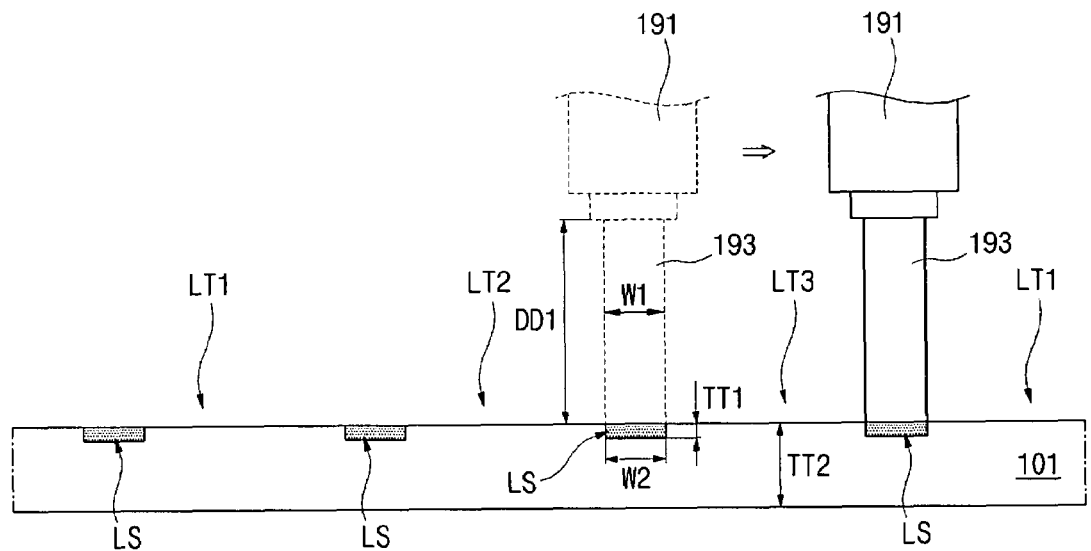
FIGS. 3A to 3D are schematic cross-sectional views illustrating a method of fabricating a color filter substrate according to an embodiment of the present invention.

FIGS. 3A to 3D are schematic cross-sectional views illustrating a method of fabricating a color filter substrate according to an embodiment of the present invention. As shown in FIG. 3A, a transparent substrate 101 and a laser apparatus (not shown) are prepared. The transparent substrate 101 includes one of Cesium (Cs), Aluminum (Al), Rubidium (Rb), and Sodium (Na), and the laser apparatus is an Nd—YAG laser apparatus having a wavelength of about 1064 nm.

In this step, a laser head 191 of the laser apparatus has a distance "DD1" of about 10 mm to about 20 mm from the transparent substrate 101 and has a moving speed with respect to a stage (not shown) of the laser apparatus of about 7,000 mm/sec to about 10,000 mm/sec. Under these conditions, a surface of the transparent substrate 101 is irradiated by the laser beam having a power of about 100 W to about 200 W.

The stage may have a cooling system (not shown) that can appropriately cool the transparent substrate 101 to prevent the transparent substrate 101 from deformation due to high heat during irradiating step. That is, the transparent substrate 101 can be cooled by the cooling system so that the transparent substrate 101 does not deform due to high heat or localized heating.

Figure 1:
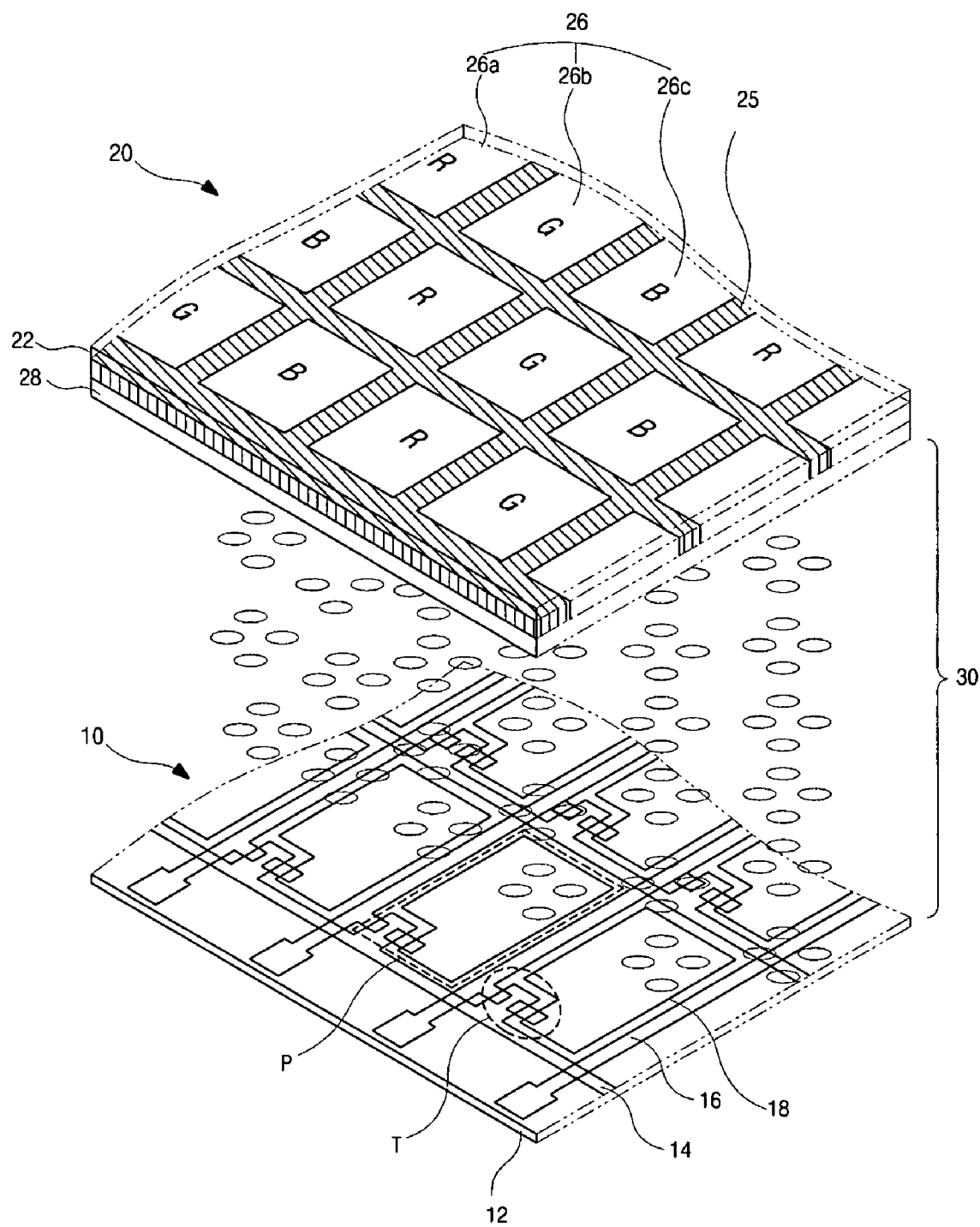
FIG. 1 is a schematic perspective view of an active matrix liquid crystal display device according to the related art.
Figure 2A:
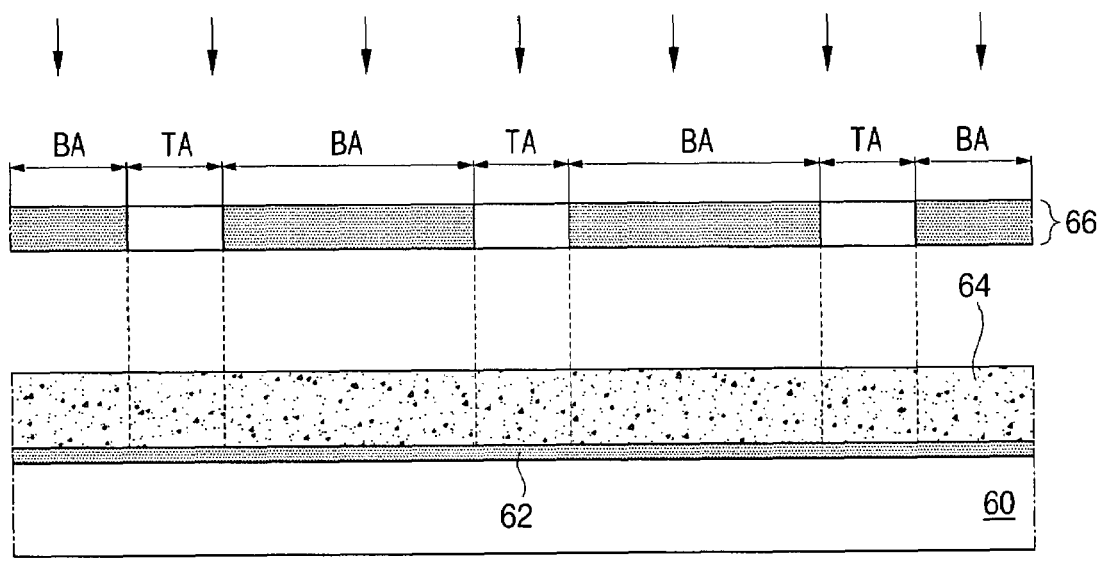
FIGS. 2A to 2G are schematic cross-sectional views illustrating a method of fabricating a color filter substrate according to the related art.
Figure 2B:
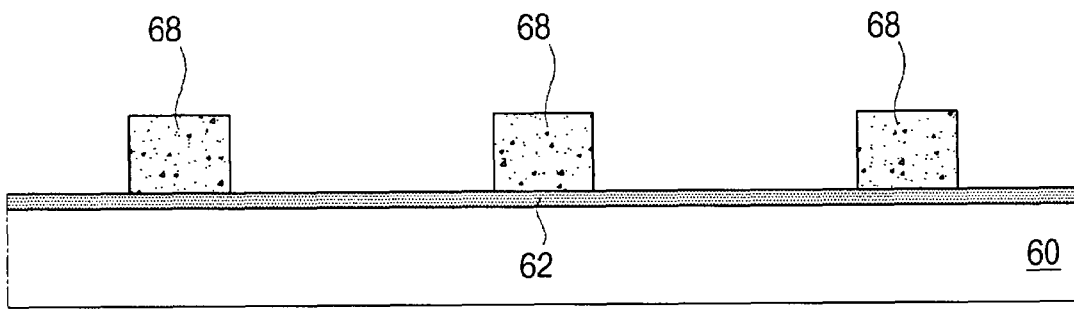
Figure 2C:
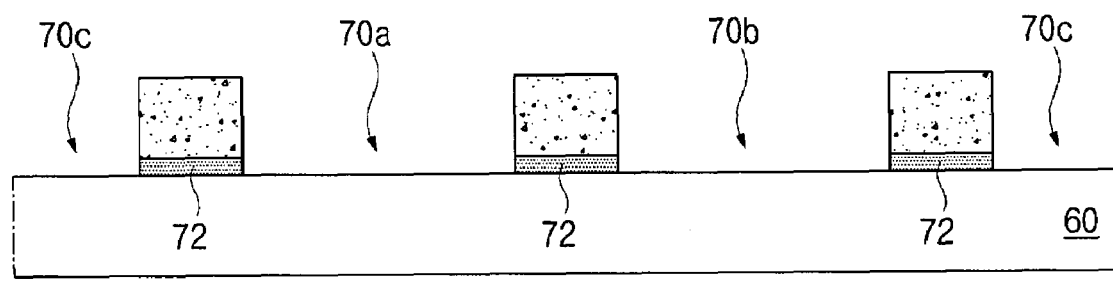
Figure 2D:
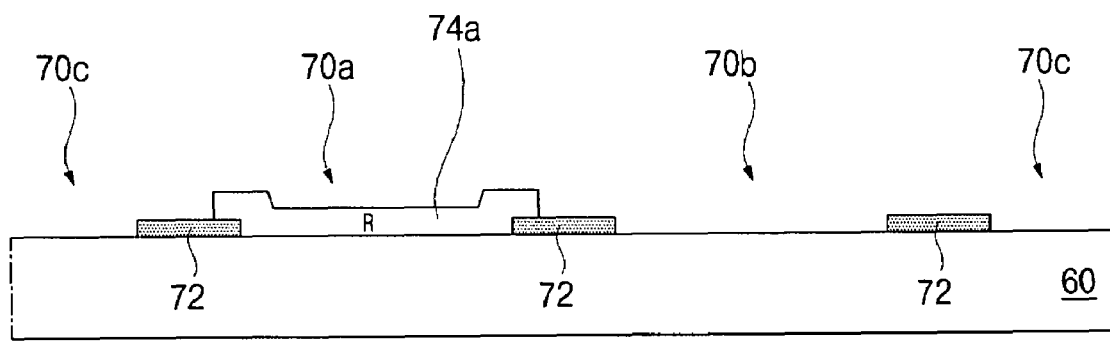
Figure 2E:
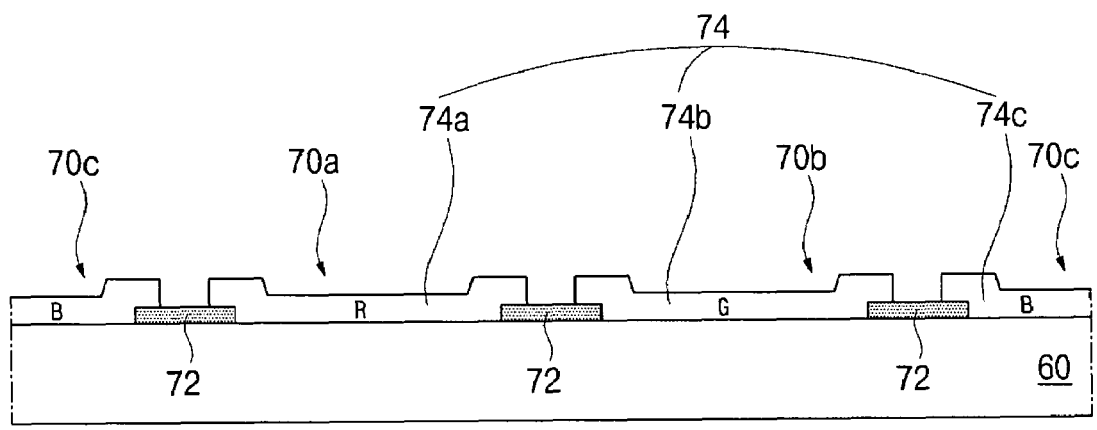
Figure 2F:
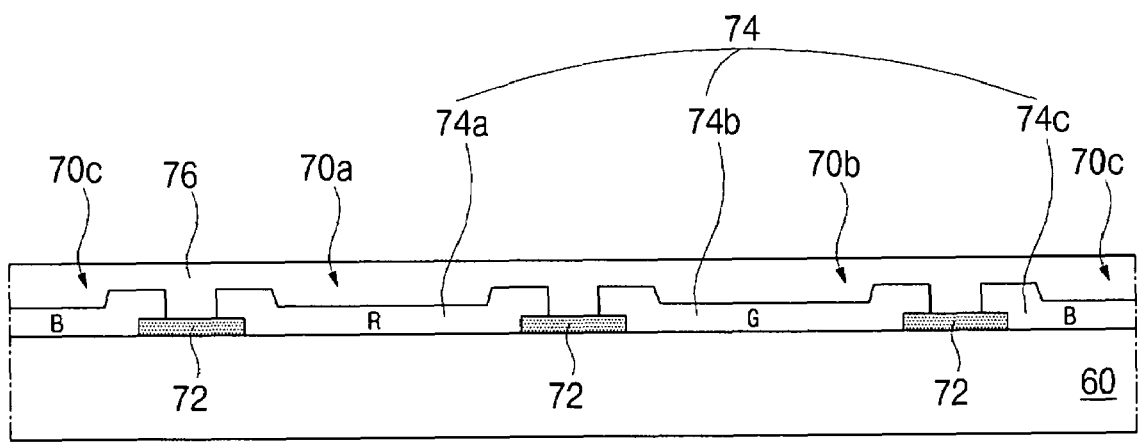
Figure 2G:
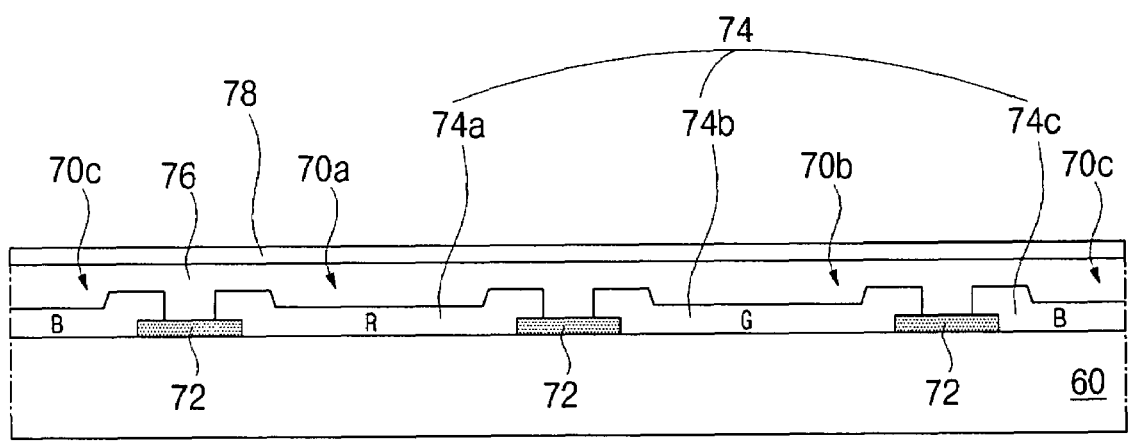

The process includes disposing the transparent substrate 101 on the stage of the laser apparatus with the laser head 191 disposed over the transparent substrate 101 at a predetermined height. Next, the laser head 191 is moved along one direction with a back-and-forth motion to form a light shielding region "LS" in the surface of the transparent substrate 101. That is, the light shielding region "LS" substantially corresponds to a region of the black matrix 72 (of FIG. 2C) according to the related art. For example, a first width "W1" of the laser beam 193 may be selected to be within the range of about 5 micrometers to about a few mm. After the width of the laser beam 193 is controlled to be about 5 micrometers to about 20 micrometers and the controlled laser beam 193 is irradiated onto the transparent substrate 101, the irradiated portion of the transparent substrate 101 is changed into the light shielding region "LS" having a second width "W2" that is about 5 micrometers to about 20 micrometers. The light shielding region "LS" corresponds to the discolored region with a black color.

As a result of the transparent substrate 101 having at least one component of Cesium (Cs), Aluminum (Al), Rubidium (Rb), and Sodium (Na), the transparent substrate 101 is changed from a transparent state into a black state by absorbing photon energy of a predetermined wavelength (1064 nm) and a predetermined power from the laser. The glass of the transparent substrate 101 has a lot of non-combination couples. Further, the glass includes Cesium (Cs), Aluminum (Al), Rubidium (Rb), and Sodium (Na) that form an electron-hole couple with silicon (Si) in the glass by absorbing the energy of the laser. Accordingly, due to the structural feature of the transparent substrate 101 having at least one component of Cesium (Cs), Aluminum (Al), Rubidium (Rb), and Sodium (Na), the irradiated area is discolored to have a black color. Therefore, the deformation time can be reduced.

Typically, a width of the light shielding region "LS" is larger than the first width "W1" of the laser beam 193 due to the resolution of the laser beam 193. For example, the difference between the second width "W2" of the light shielding region "LS" and the first width "W1" of the laserbeam 193 is about 1 to 2 micrometers. The transparent substrate 101 includes first to third light transmitting regions "LT1, LT2, and LT3" surrounded the light shielding region "LS."

The light shielding region "LS" is defined by discoloring a portion of the transparent substrate 101 with a black color so that the light shielding region "LS" has a first thickness "TT1" of one-fifth to one-third of a second thickness "TT2" of the transparent substrate 101. Here, the first thickness "TT1" of the light shielding region "LS" can be appropriately controlled by controlling the power of the laser apparatus.

For example, in case that the moving speed of the laser head 193 is about 10,000 mm/sec and the first width "W1" of the laser beam 193 is about 10 micrometers, the laser beam 193 is irradiated with an interval of about 100 micrometers by about 200 micrometers along horizontal and perpendicular directions to the transparent substrate 101 having a size of about 1 m×1 m using one laser head 193. Here, irradiating time may be required about 23 min to about 25 min. Alternatively, in case that four or six laser heads are utilized by dividing the substrate 101 into several regions, irradiating time may be required about 4 min to about 6 min.

In comparison to the related art, processing time can be reduced by at least half even including moving time between process apparatuses. Further, the material costs of the developer, etchant, and photoresist are eliminated for forming the black matrix.

The light shielding region "LS" utilized as the black matrix has a flat top surface because the light shielding region "LS" is formed by discoloring some thickness of the transparent substrate 101 without changing the thickness of the transparent substrate 101. Therefore, the light shielding region "LS" does not cause a step-difference like the black matrix 72 (of FIG. 2C) according to the related art. Although not shown, the light shielding region "LS" has a lattice shape in a plan view.

Figure 3B:
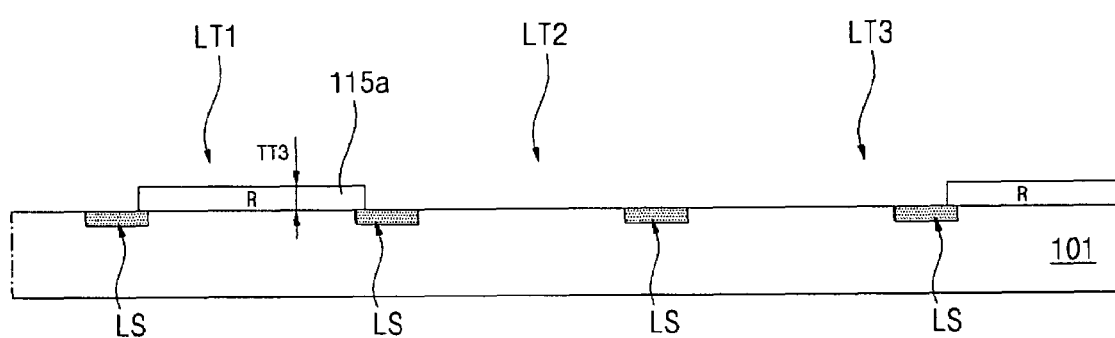

In FIG. 3B, a red resist layer (not shown) is formed by coating a red resist on the transparent substrate 101 including the light shielding region "LS." The red resist layer is exposed using a mask including a transmission area (not shown) and a blocking area (not shown), and then the exposed red resist layer is developed to form a red sub-color filter 115a in the first light transmitting region "LT1." Edges of the red sub-color filter 115a overlap the light shielding region "LS." A third thickness "TT3" of the red sub-color filter 115a across the first light transmitting region "LT1" and the light shielding region "LS" is substantially same because the light shielding region "LS" and the first to third light transmitting regions "LT1, LT2, and LT3" have a flat surface with each other.

Figure 3C:
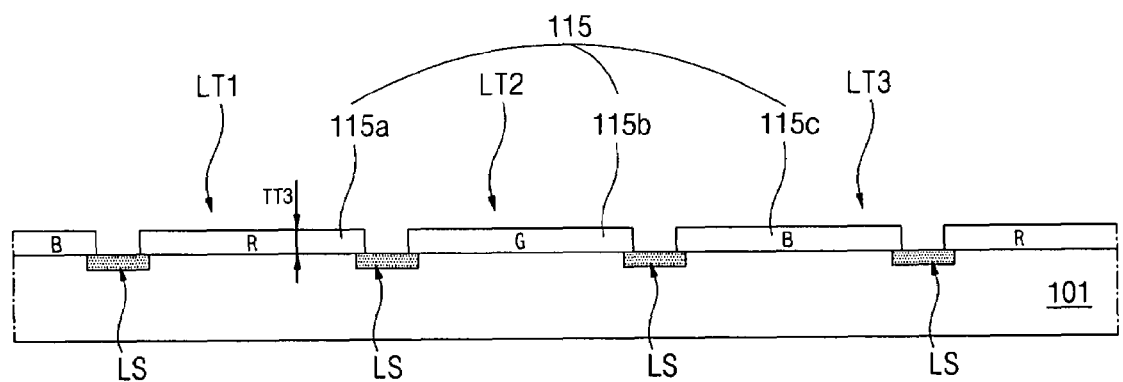

As shown in FIG. 3C, a green sub-color filter 115c is formed by coating a green resist on the transparent substrate 101 in the second light transmitting region "LT2." Edges of the green sub-color filter 115b overlap the light shielding region "LS" and substantially have the same thickness as the red sub-color filter 115a. Next, a blue sub-color filter 115c is formed by coating a blue resist on the transparent substrate 101 in the third light transmitting region "LT3." The blue sub-color filter 115c has the same thickness as each of the red and green sub-color filters 115a and 115b.

The color filter substrate according to an embodiment of the present invention has the following features. i) The light shielding region "LS" acting as a black matrix and the first to third light transmitting regions "LT1 to LT3" have a flat top surface, ii) the red, green and blue sub-color filters 115a, 115b and 115c have the same thickness as one another. Based on these features, the color filter substrate according to the present invention does not have a significant step difference. Thus, an overcoat layer is unnecessary. The red, green and blue sub-color filters 115a, 115b and 115c constitute a color filter layer 115.

Figure 3D:
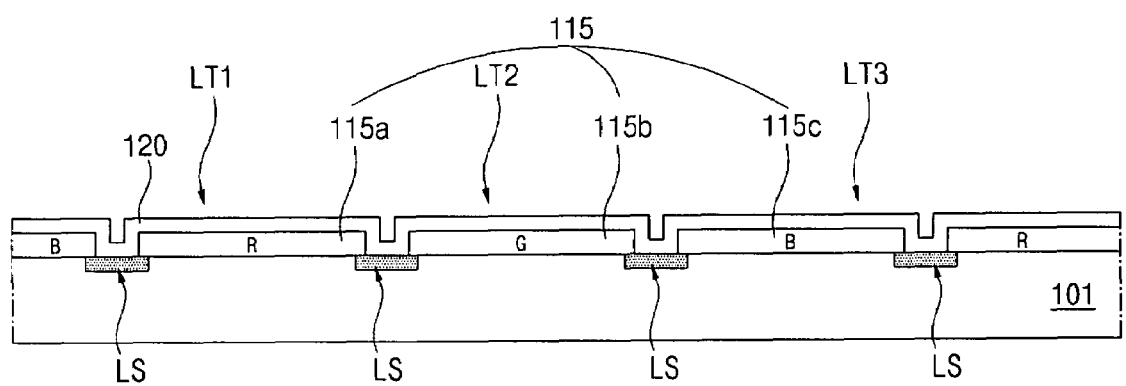

As shown in FIG. 3D, a common electrode 120 is formed by depositing a transparent conductive material, such as indium tin oxide (ITO) or indium zinc oxide (IZO), on the color filter layer 115. In this step, the common electrode 120 can obtain a substantially flat top surface because the top surfaces of the color filter layers 115 on which the common electrode 120 is formed are substantially flat and do not have a significant step difference to the substrate 101. Alternatively, a patterned spacer (not shown) may be formed on the common electrode 120 over the light shielding region "LS." For example, the patterned spacer may be formed by coating and patterning one of benzocyclobutene (BCB), photo acryl, cytop, and perfluorocyclobutene (PFCB) over the light shielding region "LS."

As explained above, the color filter substrate according to embodiments of the present invention has the light shielding region formed by irradiating a laser beam to a portion of the transparent substrate to discolor the irradiated portion of the transparent substrate.

In comparison with the embodiment shown in FIGS. 3A-3D, the color filter substrate according to the following embodiment includes a resin layer (not shown) such that a portion of the resin layer acts as a black matrix when irradiated by a laser beam having a lower power than that of the embodiment shown in FIGS. 3A-3D. According to the following embodiment, because the light shielding region of the resin layer is formed using the laser beam having a lower power than that of the previous embodiment, deformation of the transparent substrate is less likely to occur and the stage may have a cooling system.

Figure 4A:
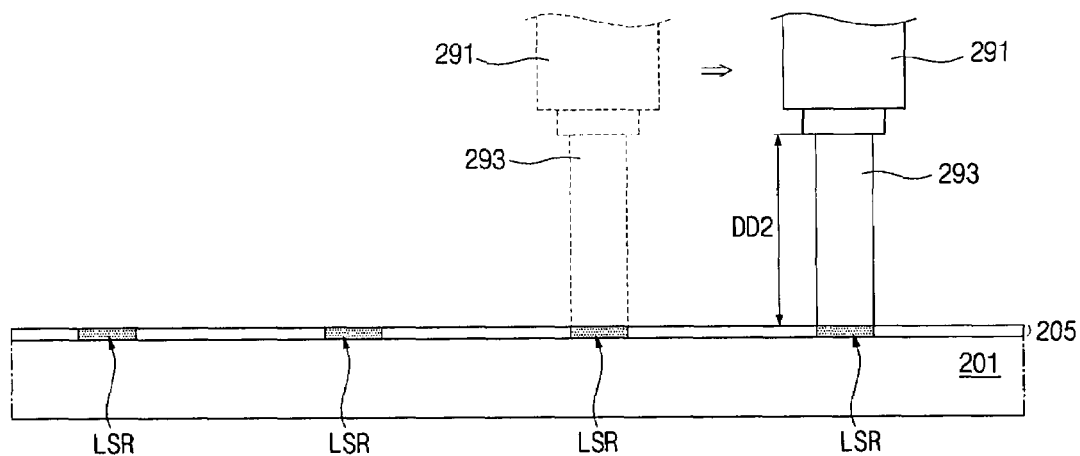
FIGS. 4A to 4D are schematic cross-sectional views illustrating a method of fabricating a color filter substrate according to an embodiment of the present invention.

FIGS. 4A to 4D are schematic cross-sectional views illustrating a method of fabricating a color filter substrate according to an embodiment of the present invention. As shown in FIG. 4A, a resin layer 205 is formed by coating a resin material on a substrate 201. For example, the resin layer 205 may be formed to have a thickness of about 3000 Å to about one micron. The transparent substrate 201 includes a glass having at least one of Cesium (Cs), Aluminum (Al), Rubidium (Rb), and Sodium (Na). The resin material includes a resin blend, including a carbonate polymer and a polyester resin, and a black coloring agent compound, such as carbon black and a fatty acid metal salt.

Next, an Nd—YAG laser apparatus (not shown) having a laser head 291 is prepared, and then the laser head 291 is disposed over the resin layer 205 with a distance "DD2" of about 20 mm. The laser beam is irradiated onto the resin layer 205 by moving the laser head 291 with a moving speed of about 10,000 mm/sec to about 12,000 mm/sec in a direct back-and-fourth motion. The laser apparatus has a frequency of about 60 Hz, and the laser head 291 has a power of about 30 W to about 100 W. The laser apparatus generates a wavelength of about 1064 nm. It is noted that heat generation of the laser beam is less than that of the laser beam of the previous embodiment.

Next, a non-irradiated region of the resin layer 205 is removed. For example, the substrate 201 including the resin layer 205 after irradiating is dipped in an IPA (isopropylalcohol) solution or an alcohol to remove the non-irradiated regions of the resin layer 205.

In this step, the resin layer 205 includes the light shielding region "LSR" discolored to have a black color. After the removing step, the irradiated region of the resin layer 205 is remained and is defined as a light shielding layer 210. Although not shown, the light shielding layer 210 has a lattice shape in a plan view, therefore, the other regions in which the resin layer 205 are removed are defined as first to third openings 215a, 215b and 215c of the light shielding layer 210.

Substantially, the thickness of the resin layer 205 is much thinner than a black matrix made of chromium (Cr) or a black resin of the related art. For example, the thickness of the resin layer 205 can be about 3000 Å to about one micron. Therefore, the step difference of the light shielding layer 210 on the substrate 201 does not affect the step difference of a color filter and a common electrode that will be formed later.

In other words, in a low cell gap type liquid crystal display device, when the step difference of the black matrix according to the related art generally has a large value, the difference between a first height of the color filter layer overlapping the black matrix and a second height of the color filter layer not overlapping the black matrix has the same large value. Therefore, the difference may affect the difference of the common electrode, so the common electrode may be shorted to the pixel electrode in the other substrate. In particular, the low cell gap type LCD is actively developed because it has an advantage of compact size. Consequently, the step difference of the black matrix should be solved for the low cell gap type LCD. The light shielding layer 210 according to embodiments of the present invention can solve the step difference of the black matrix as well as the process time and cost of the black matrix.

The light shielding layer 210 according to the embodiment can be obtained using the laser beam having a lower power than that of the laser beam according to the previous embodiment because the resin layer 205 includes carbon black. That is, the resin layer 205 can be easily discolored using the laser beam having the lower power similar to the glass, and heat generation possibility is reduced because an intensity of the laser beam is reduced in comparison with that of the previous embodiment.

Figure 4B:
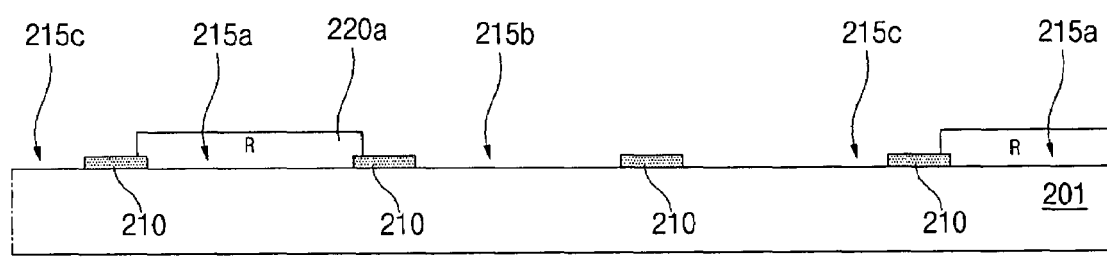

In FIG. 4B, a red sub-color filter (not shown) is formed by coating a red resist on the light shielding layer 210, by exposing the red resist using a mask (not shown) including a transmission region (not shown) and a blocking region (not shown), and by developing the exposed portion of the red resist. Through this step, the red sub-color filter 220a is disposed in the first openings 215a, and edges of the red sub-color filter 220a overlap the light shielding layer 210.

Figure 4C:
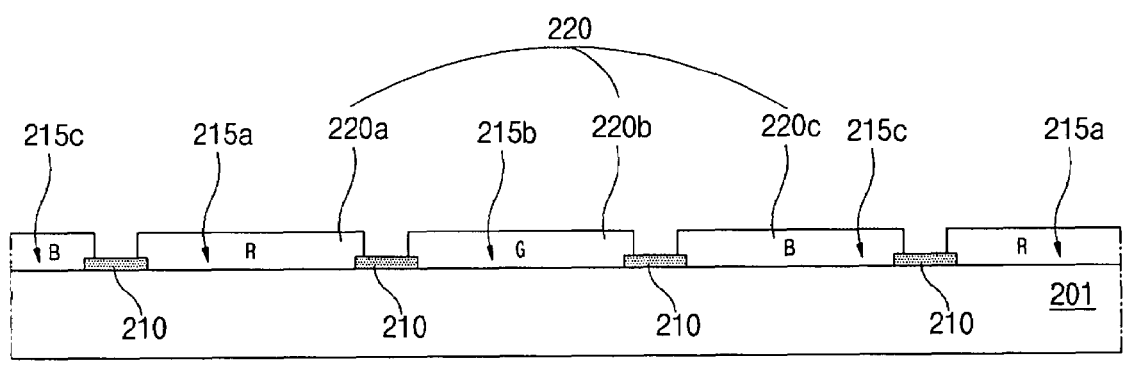

Next, in FIG. 4C, a green resist is coated on the red sub-color filter 220a, and the green resist is patterned into a green sub-color filter 220b to be disposed in the second openings 215b. Sequentially, a blue sub-color filter 220b is formed by the same process as the red sub-color filter 220a or the green sub-color filter 220b in the third openings 215c. Here, similarly to the red sub-color filter 220a, edges of the blue sub-color filter 220b and edges of the green sub-color filter 220b overlap the light shielding layer, respectively. The red, green and blue sub-color filters 220a, 220b and 220c have the same thickness as one another. The red, green and blue sub-color filters 220a, 220b and 220c constitute a color filter layer 220.

Figure 4D:
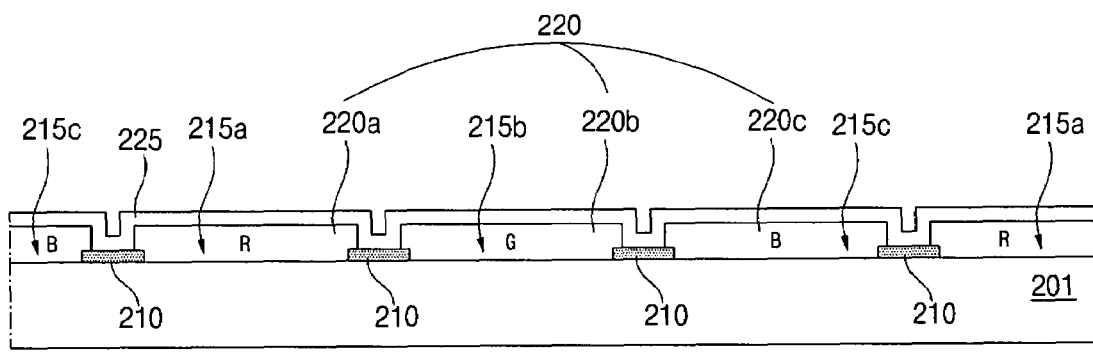

In FIG. 4D, a common electrode 225 is formed by depositing a transparent conductive material, such as indium tin oxide (ITO) or indium zinc oxide (IZO) on the color filter layer 220.

In this step, the common electrode 225 is substantially flat and do not have a significant step difference to the substrate 201. Accordingly, an overcoat layer between the color filter layer 220 and the common electrode 225 is unnecessary.

Further, a patterned spacer (not shown) may be formed on the common electrode 225 over the light shielding layer 210. For example, the patterned spacer may be formed by coating and patterning one of benzocyclobutene (BCB), photo acryl, cytop, and perfluorocyclobutene (PFCB) over the light shielding layer 210.

Figure 5:
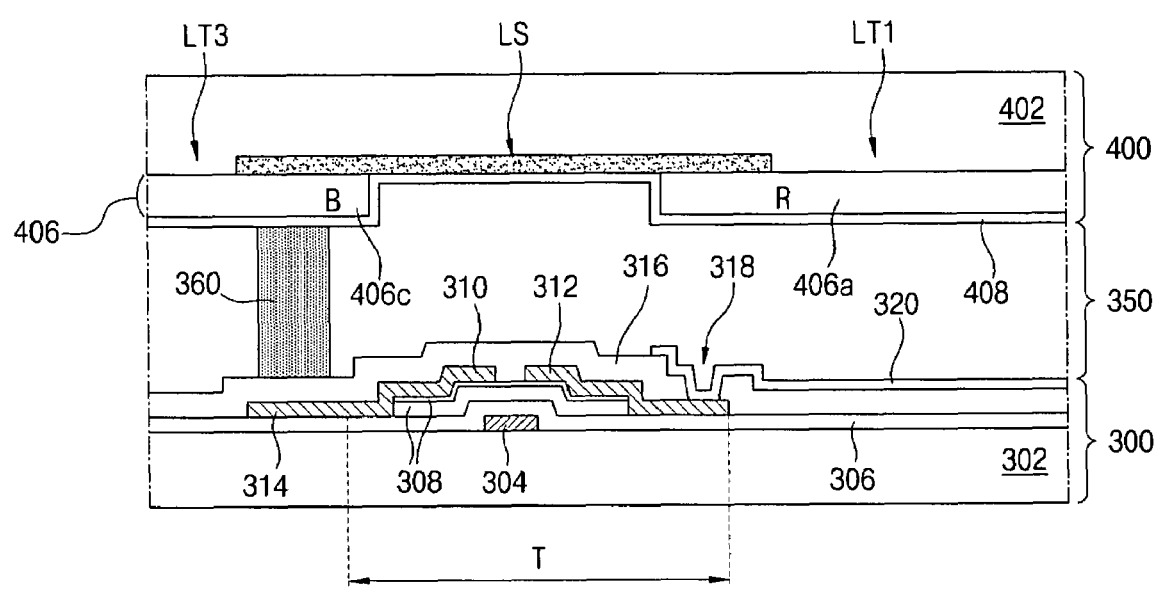
FIG. 5 is a schematic cross-sectional view of an LCD device according to an embodiment of the present invention.

FIG. 5 is a schematic cross-sectional view of an LCD device according to an embodiment of the present invention. As shown in FIG. 5, an array substrate 300 and a color filter substrate 400 face each other, and a layer of liquid crystal molecules 350 is disposed between the array substrate 300 and the color filter substrate 400. The array substrate 300 includes a first transparent substrate 302, a thin film transistor "T" including a gate electrode, a semiconductor layer, a source electrode and a drain electrode on an inner surface of the first transparent substrate 302, and a pixel electrode 318 connected to the thin film transistor "T." Specifically, the gate electrode 304 is formed on the first transparent substrate 302, a gate insulating layer 306 is formed on the gate electrode 304, the semiconductor layer 308 is formed on the gate insulating layer 306 over the gate electrode 304, and the source electrode 310 and the drain electrode 312 spaced apart from the source electrode 310 are formed on the semiconductor layer 308. Further, a data line 314 is connected to the source electrode 310, substantially, the source electrode 310 is extended from the data line 314. A passivation layer 316 is formed on the source and drain electrodes 310 and 312 and has a drain contact hole 318 that exposes a portion of the drain electrode 312. The pixel electrode 320 is formed on the passivation layer 316 and is connected to the drain electrode 312 via the drain contact hole 318.

The color filter substrate 400 includes a second transparent substrate 402 containing a light shielding region "LS," a color filter layer 406 including red, green and blue sub-color filters 406a, not shown and 406c in first to third light transmitting regions "LT1, not shown and LT3," and a common electrode 408 on the color filter layer 406. Substantially, the pixel electrode 320 is formed to correspond to each of the red, green and blue sub-color filters 406a, not shown and 406c. Further, a patterned spacer 360 is disposed between the array substrate 300 and the color filter substrate 400 and corresponds to the light shielding region "LS." Although not shown, first and second orientation films (not shown) are formed inners surfaces of the array substrate 300 and the color filter substrate 400 and contacts the patterned spacer 360. Alternatively, the patterned spacer 360 may be applied to the LCD including the color filter substrate 400 in which the light shielding layer 210 (of FIG. 4D) of the resin material having the carbon black is formed.

Figure 6:
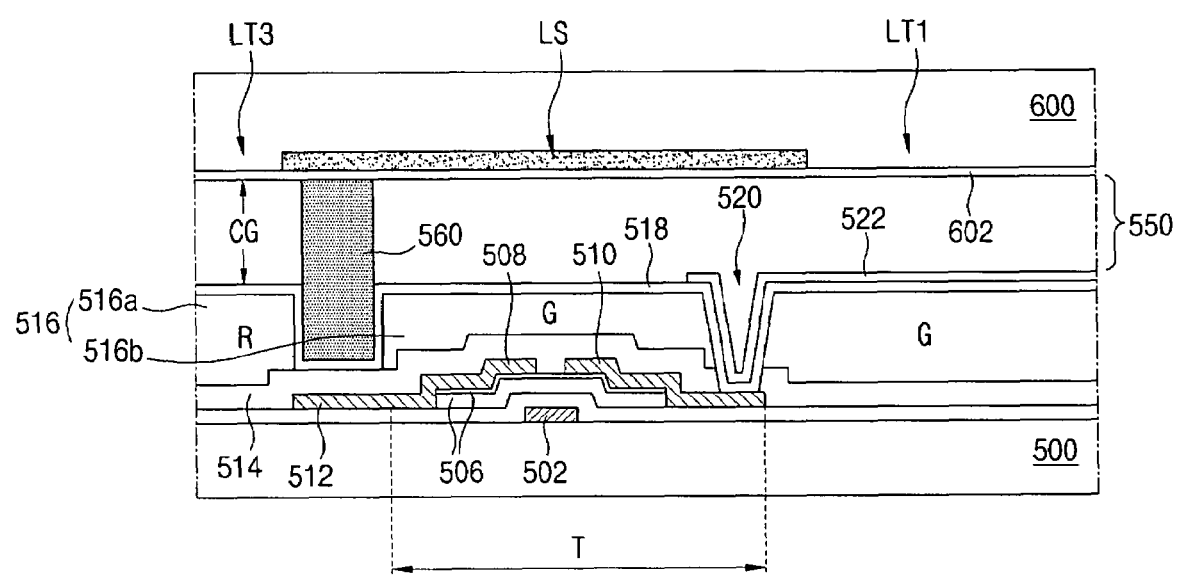
FIG. 6 is a schematic cross-sectional view of a color filter on a thin film transistor (COT) type LCD according to an embodiment of the present invention.

FIG. 6 is a schematic cross-sectional view of a color filter on a thin film transistor (COT) type LCD according to an embodiment of the present invention. As shown in FIG. 6, first and second substrates 500 and 600 face each other and a liquid crystal layer is interposed therebetween. A thin film transistor "T," which includes a gate electrode 502, a semiconductor 506, source and drain electrodes 508 and 510, is formed in the first substrate 500. Further, a data line 512 is formed and is connected to the source electrode 508. A first passivation layer 514 is formed on the thin film transistor "T," a color filter layer 516 is formed on the passivation layer 514, and a second passivation layer 518 is formed on the color filter layer 516. At this time, the color filter layer 516 includes red, green and blue sub-color filters 516a, 516b and not shown. However, for convenience sake, in FIG. 6, with respect to the green sub-color filter 516b, the green sub-color filter 516b and the red sub-color filter 516a adjacent to the green sub-color filter 516b are illustrated.

The first passivation layer 514, the color filter layer 516, and the second passivation layer 518 commonly have a drain contact hole 520 that exposes a portion of the drain electrode 510. A pixel electrode 522 is formed on the second passivation layer 518 and is connected to the drain electrode 510 via the drain contact hole 520.

A light shielding region "LS" is contained in an inner surface of the second substrate 600 and corresponds to the thin film transistor "T" and the data line 512. As explained in FIG. 3A to 3D, the light shielding region "LS" is a discolored region with a black color by irradiating a laser beam.

A common electrode 602 is formed on the inner surface of the second substrate 600 including the light shielding region "LS." Substantially, the liquid crystal layer 550 is disposed between the pixel electrode 522 and the common electrode 602. The thickness of the liquid crystal layer 550 corresponds to a cell gap "CG," and a patterned spacer 560 is formed between the pixel electrode 522 and the common electrode 602 so that the patterned spacer 560 corresponds to the light shielding region "LS" and the data line 512. In FIG. 6, although the patterned spacer 560 is disposed in the gap space between the red sub-color filter 516a and the green sub-color filter 516b, the position of the patterned spacer 560 may be various in accordance with the position of the light shielding region LS.

As explained above, when the light shielding region or the light shielding layer according to the present invention is applied to the COT type LCD, the process time and cost of the black matrix can be effectively reduced. Although not shown, the light shielding region of the light shielding layer according to the present invention can be applied to the thin film transistor on the color filter layer (TOC) type LCD as well as the COT type LCD.

According embodiments of the present invention, a substrate for the LCD can be prevented light leakage using the light shielding means by laser beam without using the black matrix by the photolithography, thereby reducing the process time and cost and improving the process yield. Further, according to the light shielding means of embodiment of the present invention, when the color filter layer and the light shielding means are formed on the same substrate, the light shielding means does not substantially have the step difference. Therefore, an additional overcoat layer can be omitted, thereby reducing the process time and cost regarding the overcoat layer. Furthermore, because the light shielding means is formed by selectively discoloring with black color a desired region, the other regions can be defined as the light transmitting region. Therefore, the black defect of the related art can be prevented, thereby improving product yield.

It will be apparent to those skilled in the art that various modifications and variations can be made in the LCD device of the present invention without departing from the spirit or scope of the invention. Thus, it is intended that the present invention cover the modifications and variations of this invention provided they come within the scope of the appended claims and their equivalents.

What is claimed is:

1. A method of fabricating a substrate for a liquid crystal display device, comprising:

disposing a transparent substrate on a stage of a laser apparatus;

irradiating a laser beam having a predetermined power onto the transparent substrate to form a light shielding region in the transparent substrate surrounding first to third light transmitting regions, wherein the color of the light shielding region of the transparent substrate is changed to black by irradiating the laser beam; and forming a color filter layer including red, green and blue sub-color filters respectively in the first to third light transmitting regions, wherein boundaries of the red, green and blue sub-color filters correspond to the light shielding region.

2. The method of fabricating a substrate for a liquid crystal display device according to claim 1, wherein the irradiating the laser beam includes moving the laser beam at a speed of about 7,000 mm/sec. to about 10,000 mm/sec with respect to the substrate.

3. The method of fabricating a substrate for a liquid crystal display device according to claim 1, wherein the predetermined power is about 100 W to about 200 W.

4. The method of fabricating a substrate for a liquid crystal display device according to claim 1, wherein the light shielding region has a first thickness that is one-fifth to one-third of a second thickness of the transparent substrate.

5. The method according to claim 1, wherein the laser apparatus is a neodymium-yttrium aluminum garnet (Nd—YAG) laser apparatus generating a laser beam having a wavelength of about 1064 nm.

6. The method of fabricating a substrate for a liquid crystal display device according to claim 1, wherein the transparent substrate is a glass having at least one of Cesium (Cs), Aluminum (Al), Rubidium (Rb), and Sodium (Na).

* * * * *